(12) United States Patent
Brianti et al.

(10) Patent No.: US 6,246,731 B1
(45) Date of Patent: Jun. 12, 2001

(54) METHOD AND STRUCTURE FOR INCREASING THE MAXIMUM CHANNEL SPEED OF A GIVEN CHANNEL

(75) Inventors: Francesco Brianti, San Jose; Hakan Ozdemir, Campbell, both of CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/126,158

(22) Filed: Jul. 30, 1998

(51) Int. Cl.[7] ........................................ H04L 1/22
(52) U.S. Cl. .................. 375/341; 375/290; 360/40; 360/65; 714/795
(58) Field of Search ........................... 375/262, 263, 375/340, 341, 290; 714/794, 795; 360/40, 65

(56) References Cited

U.S. PATENT DOCUMENTS

| 4,644,564 | 2/1987 | Dolivo et al. | 375/18 |
| 5,375,145 | 12/1994 | Abbott et al. | 375/98 |
| 5,410,556 | * 4/1995 | Yeh et al. | 371/43 |
| 5,521,767 | 5/1996 | Weng et al. | 360/46 |
| 5,844,741 | * 12/1998 | Yamakawa et al. | 360/65 |
| 5,881,075 | * 3/1999 | Kong et al. | 371/43.7 |

* cited by examiner

Primary Examiner—Amanda T. Le
(74) Attorney, Agent, or Firm—Theodore E. Galanthay; Lisa K. Jorgenson; Renee Michelle Larson

(57) ABSTRACT

Parallel processing in the form of two PR4 Viterbi Detectors connected in parallel operates to increase the maximum channel speed of a given data channel of a magnetic media. According to a target equation defined as Read(D)=$(1-D^2)^2$Written(D), in which D is the delay of a data of the channel, a first Viterbi Detector processes even data samples of the channel that have been equalized according to the target equation and a second Viterbi Detector connected in parallel processes odd data samples of the channel that have likewise been equalized according to the target equation. The use of two parallel-connected Viterbi Detectors in this fashion allows data to be processed at half-rate rather than full-rate, thereby increasing the overall channel speed.

16 Claims, 3 Drawing Sheets

METHOD AND STRUCTURE FOR INCREASING THE MAXIMUM CHANNEL SPEED OF A GIVEN CHANNEL

CROSS REFERENCE TO RELATED APPLICATIONS

The subject matter of the present application is related to copending U.S. application Ser. No. 08/995,512, filed Dec. 22, 1997, titled "Timing Recovery for Data Sampling of a Decoder", assigned to SGS-Thomson Microelectronics, Inc. and expressly incorporated herein by reference.

FIELD OF THE INVENTION

The present invention relates generally to improvements in a detector for data sampling, and more specifically to the use of parallel-connected Viterbi Detectors to simultaneously process even and odd samples of data according to a target equation.

BACKGROUND OF THE INVENTION

It is known in the art that increasing the amount of data that can be transmitted or stored over a given time, referred to as density of data, provides the advantages of reducing the cost and time associated with transmitting and storing data. Because of these advantages, it has long been a goal in the electronics industry to increase the density of data that is transmitted or stored. To this end, many systems use run-length limited (RLL) coding and peak detection (PD) techniques to achieve high reliability of data transmission and storage at high densities. An even better increase in density can be realized through the use of more advantaged techniques such as partial response (PR) signaling and maximum-likelihood (ML) methodology, or a combination of the two. For instance, today's disk drive read/write channels make use of the Partial Response Maximum Likelihood (PR ML) method in order to retrieve information from magnetic media, such as a disc drive.

PR signaling is a synchronous detection scheme in which each pulse contains more than one non-zero sample such that each sample contains just part of the pulse. ML uses the sequence of received read samples to determine the actual data sequence and user data. While PR signaling is a technique that enforces spectral properties and allows a controlled amount of intersymbol interference. ML sequence estimation, particularly with the Viterbi algorithm, improves the detection of symbol sequences in the presence of intersymbol interference. ML sequence estimation allows most PR schemes to perform practically in a system with errors caused by intersymbol interference. Usually the ML operation is performed by a detector, such as the Viterbi Detector (VD) that uses the Viterbi algorithm to determine which sequence, of all possible data sequences, is the sequence most like the actual data sequence as determined by the minimum square error.

Viterbi detection uses a recursive technique called dynamic programming that was originally used to find a solution to the classical shortest path problem, but has been tailored to data detection. The recursive nature of dynamic programming causes the total processing effort to grow only linearly with the message length of data, as opposed to non-linear growth. The Viterbi algorithm is used to find the "most likely" path through the trellis diagram. The trellis diagram is determined by the modulation code and the memory length of the system. The maximum-likelihood data sequence is a path through this diagram. The trellis describing the noiseless output sequences for a channel equalized to EE ... EPR4=$E^m$PR4 (m=1, 2, 3, ... ) has $2^{(m+2)}$ states. For m=0, in the case of PR4, two trellises with two states each can be used. These two states represent the number of states required of a Viterbi detector assuming additive white Gaussian noise; a Viterbi detector for correlated Gaussian noise would require many more states. A detailed treatment of the subject of Viterbi Detection can be found by reference to Chapter 7 of Jan W. M. Bergmans book entitled "Digital Baseband Transmission and Recording," published in 1996 by Kluwer Academic Publishers, which is herein incorporated by reference.

PR signaling also allows a better handling of intersymbol interference and a more efficient utilization of the bandwidth of a given channel. Because the intersymbol interference is known to be present, the receiver can take it into account. PR signaling in communications allows transmissions at the Nyquist rate, and provides a favorable trade-off between error probability and the available spectrum. The PR systems described by the polynomials (1+D), (1−D), and $(1−D)^2$ are called duobinary, dicode, and class-IV, respectively, where D represents one bit cell delay and $D^2$ represents two bit cell delays of the channel. $D=e^{-j\omega t}$, where $\omega$ is a frequency variable in radians per second and t is the sampling time interval in seconds.

Conventional disc drives are used to record and retrieve information. As discs become more prevalent as the medium of choice for storing information in both computer and home entertainment systems and equipment, disk drives likewise become more prevalent and important components of such systems. PR and ML have been used in communications signaling for years, and have now been applied commercially within magnetic hard disk drives. The PR that is today commonly used to recover information from a disk drive or other magnetic media is class-IV (PR4); it is a preferred partial response system in disc drives, since there is a close correlation between the idealized PR4 spectrum and the natural characteristics of a magnetic data write/read channel. Application of the Viterbi algorithm to PR4 data streams within a magnetic recording channel is known to improve detection of original symbol sequences in the presence of intersymbol interference and also to improve signal to noise ratio (SNR) over comparable peak detection techniques.

PR4 is demonstrated by the following equation: (1−D) $(1+D)^n$, where n is the degree of the (1+D) polynomial and D is the delay element, as described above. Of course, the class of PR is defined by the degree of the polynomial; thus, n=1 defines PR4, n=2 defines EPR4, and n=3 defines EEPR4, or simply $E^{n-1}$ PR4. EPR4 and EEPR4 are higher order PR detection schemes that further increase the density of data that can be stored and transmitted. The PR4 magnitude response, $1−D^2$, emphasizes midband frequencies and results in a read channel with increased immunity to noise and distortion at both low and high frequencies.

Because of the channel properties of current disc drives or other magnetic or storage media, the read-back operation from a drive can be modeled as a 1−D process, meaning that the signal at the input of the read/write channel is different from zero only when a transition in the magnetization of the channel occurs. Thus, the $(1+D)^n$ coefficient of PR4 actually represents the low-pass nature of the read channel itself. The whole channel model can therefore be considered to be the PR4 response convolved with written data, i.e.: Read(D)= $(1−D)(1+D)^n$ Written(D). This target equation is representative of the ideal response of the channel that would allow for perfect data reconstruction and thus the equation to which it would be desirable to have the input signal to the channel matched to. The VD that performs the ML operation is therefore designed with this target equation in mind. The target equations for various classes of PR, including PR4, are demonstrated in FIG. 1.

As recording densities in the industry increase, it is proven that a higher order PR is needed to better match actual channel response to the ideal channel response. Unfortunately, higher order PR schemes, such as EPR4 and EEPR4 require more complex calculations, meaning less speed and more power, and more circuitry area in the VD. Additionally, a better quality head of the channel and magnetic media are often required to raise the SNR to a desired level.

In light of the foregoing, there is an unmet need in the art to be able to increase the maximum speed of the channel as much as possible so as to realize corresponding increases in the density of data that is transmitted or stored. This would preferably be accomplished without resorting to the use of higher order PR signaling with its attendant problems.

SUMMARY OF THE INVENTION

It is an object of the present invention to be able to increase the maximum speed of a channel of a magnetic media or other storage media in order to realize corresponding increases in the density of data that is transmitted or stored.

Therefore, according to the present invention, a method and structure for increasing the maximum channel speed of a storage media, such as a disk drive, is disclosed. Two PR4 Viterbi Detectors connected in parallel operate to increase the maximum channel speed of a given data channel of the magnetic media by allowing data of the channel to be processed at half-rate rather than full-rate. According to a target equation defined as Read(D)=$(1-D^2)^2$Written(D), in which D is the delay of a data of the channel, a first Viterbi Detector processes even data samples of the channel that have been equalized according to the target equation and a second Viterbi Detector connected in parallel processes odd data samples of the channel that have likewise been equalized according to the target equation.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

DESCRIPTION OF THE INVENTION

The present invention uses the concept of parallel processing in conjunction with partial response (PR) signaling to increase the maximum speed of the channel as much as possible so as to realize corresponding increases in the density of data that is transmitted or stored. Specifically, parallel processing is used in the Viterbi Detector (VD) that performs the maximum-likelihood (ML) operation to determine which data sequence of many data sequences is most like the actual data sequence. This may be accomplished by processing even and odd bits at the same time (in parallel) by one VD or by having multiple VDs process bits in parallel.

The present invention utilizes a modified target equation to describe the PR4 VD that performs the ML operation. A prefilter transforms the symbol response H(t) of the recording channel into a desired response, defined by the target equation. This modified target equation of the channel model is defined:

$$\text{Read}(D) = (1-D)(1+D)^2(1-D)\text{Written}(D)$$
$$= (1-D^2)^2\text{Written}(D)$$
$$= (1-2D^2+D^4)\text{Written}(D)$$

According to this modified target equation, it is possible to process even and odd samples of the channel separately and simultaneously since the value of Read(D) at even/odd positions depends solely upon the value of Written(D) at even/odd positions, such as 1, $D^2$, $D^4$. The present invention therefore provides for two separate VDs to be built according to this target equation.

Figure 1:
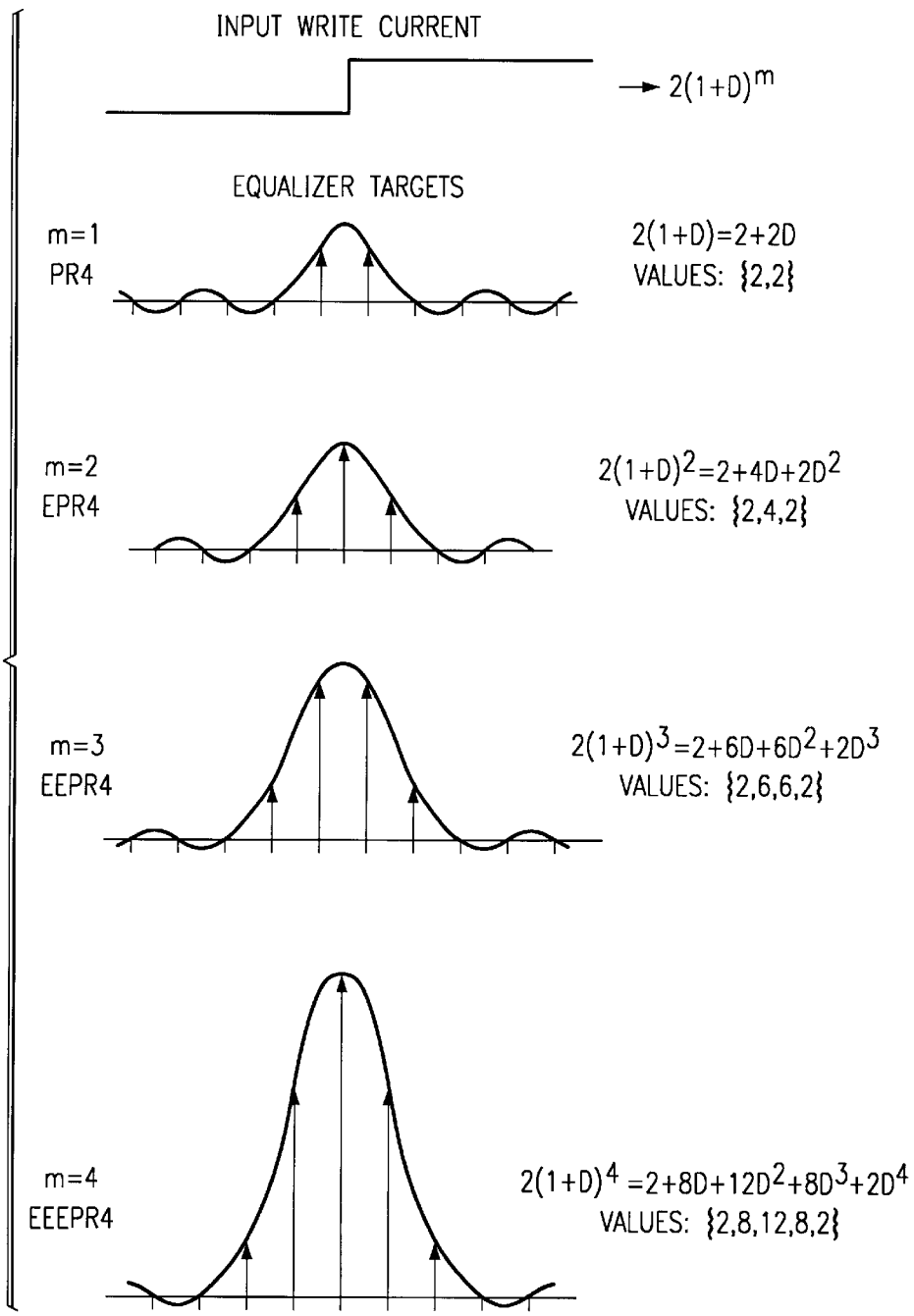
FIG. 1 illustrates target equations for various classes of partial response (PR)
Figure 2:
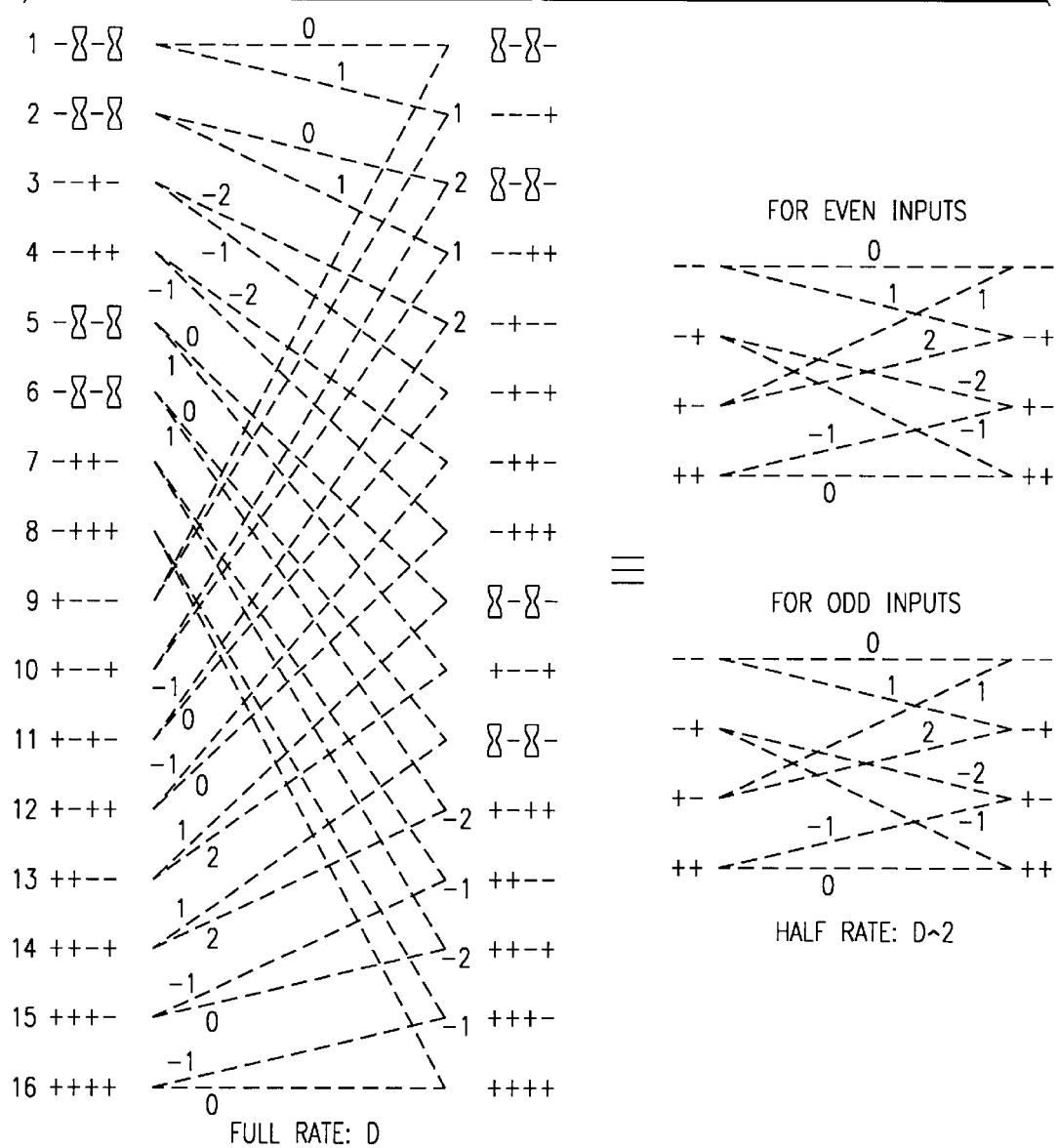
FIG. 2 is a trellis diagram, according to the present invention.

Referring now to FIG. 2, using the present invention the 16-state trellis diagram on the left side of the figure representative of a single, 16-state VD can be replaced with two, four-state trellis diagrams representative of two VDs operating in parallel—one for even inputs and the other for odd inputs. It can be seen that the intermediate symbols masked with rectangles do not affect the ideal values for the state transitions and so it is possible to simply omit these symbols. Considering all of the transitions from states -X-X to states X-X-, where X denotes a masked intermediate symbol, the ideal input value to the VD has to be zero. Performing a similar analysis for all possible state transitions, the 16-state trellis diagram for a full symbol rate (D) VD can be reduced to two parallel, half-rate ($D^2$) VDs, as shown on the right side of FIG. 2. Using two VDs in parallel allows data to be processed at half-rate rather than full-rate, thereby reducing the sampling rate necessary for processing a given amount of data over a given period of time. Additionally, this approach allows the hardware of the 16-state VD to be replaced with hardware capable of processing only four states.

Figure 3:
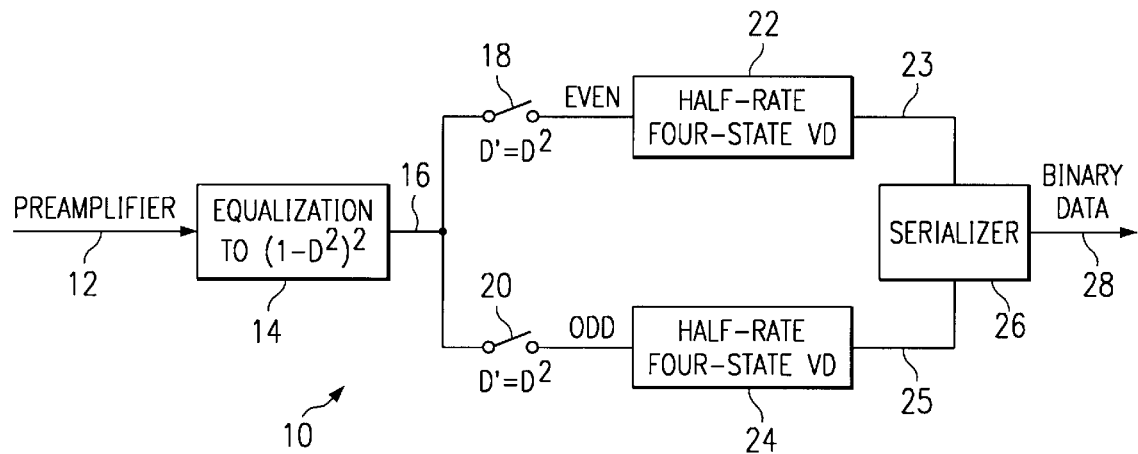
FIG. 3 is a representative implementation of two Viterbi Detectors connected in parallel, according to the present invention.

Referring now to FIG. 3, a representative implementation 10 of two VDs in parallel, according to the present invention, is shown. The data retrieved from a preamplifier of a magnetic media 12, such as from a disc drive, is presented to an equalizer 14 that operates to equalize the incoming data to the target formula: Read(D)=$(1-D^2)^2$Written(D). The prefiltered and sampled sequence of equalized data 16 is then split into even and odd components of data rate ½T. The data are separated into even and odd samples by switches 18 and 20 before being presented to half-rate, four-state Viterbi Detectors 22 and 24, respectively. VDs 22 and 24 operate in parallel to simultaneously process even and odd samples according to the target formula. The output data 23 and 25, respectively, of VDs 22 and 24 are next provided to Serializer 26. The VD outputs 23 and 25 are interleaved by Serializer 26 to restore the serial nature to the data and outputs binary data 28.

The use of two VDs that implement the above target equation to recover information from a disk allows for faster operation and less power to be consumed by the VDs with almost no resulting increase in the circuit area of the VD. The invention may therefore be easily used in read/write channels to more efficiently retrieve information from magnetic media, such as disc drives.

Figure 4:
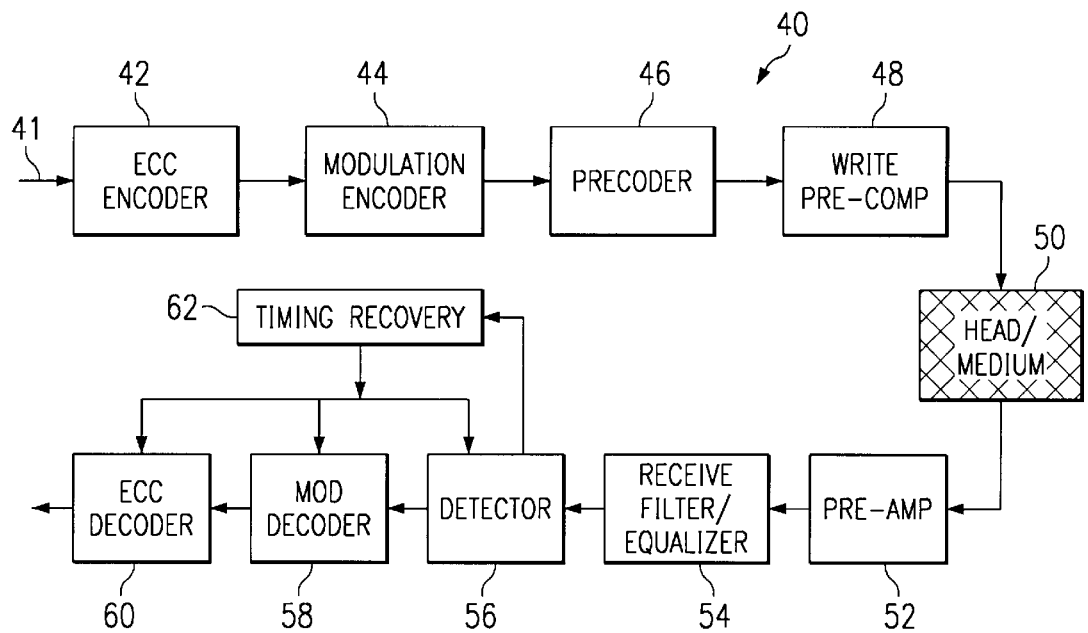
FIG. 4 is a recording channel system of the type used in a magnetic media or other storage media.

Referring now to FIG. 4, a recording channel system of the type used in a magnetic media or other storage media is illustrated. The recording channel system 40 makes use the parallel-connected VDs described above in conjunction with FIG. 3; in fact, FIG. 3 correspond to Blocks 56 and 58 of FIG. 4. Error correction coding (ECC) Encoder 42 operates to add redundant bytes to the actual data 41 being supplied to it in order to correct erroneous bytes of the data. Modulation encoder 44 provides additional coding to allow better timing recovery and reduction of the error rate due to colored noise, and head and media effects of the magnetic media. Precoder 46 is optional and can be used to additionally reduce the probability of some specific error events and, in some cases, to allow operation without regard to the polarity of differential inputs. Write Pre-comp 48 is used to compensate for nonlinear write effects such as non-linear bit shifts at the magnetic flux transitions of the data. Pre-Amplifier 52 operates to amplify the medium signal provided by medium 50. Equalizer 54 is used to shape the medium (head) signal to the desired frequency response suitable for the VD; it is shown as equalizer 14 in FIG. 3. Detector 56 is illustrated as VD detectors 22, 24 of FIG. 3 and is hardware that implements the Viterbi algorithm to sequentially detect data bits in the existence of noise. Timing recovery block 62 samples the equalizer 54 outputs at the correct instances in order for the Viterbi algorithm to work properly. Timing recover block 62 also supplies a clock to the rest of the digital portion of the read channel of the magnetic medium. Modulation decoder 58 decodes data encoded by the modulation encoder 44. ECC decoder 60 performs error correction in accordance with the ECC encoder 42.

While the invention has been particularly shown and described with reference to a preferred embodiment, it will be understood by those skilled in the art that various changes in form and detail may be made therein without departing from the spirit and scope of the invention.

What is claimed is:

1. A detector system that increases the maximum speed of a channel of a storage medium, comprising:
   a first detector that receives even data samples of a data channel of a storage medium; and
   a second detector coupled in parallel to the first detector that receives odd data samples of the data channel of the storage medium;
   wherein the first detector and the second detector simultaneously process the even data samples and the odd data samples of the channel, respectively, in parallel in accordance with a target equation, wherein the target equation is defined as $Read(D)=(1-D^2)^2 Written(D)$, where D is the delay of a data of the channel.

2. The system of claim 1, wherein the first detector and the second detector are Viterbi Detectors.

3. The system of claim 1, wherein the storage medium is a disc drive.

4. A recording channel system that increases the maximum speed of a channel of a storage medium, comprising:
   an equalizer that receives data from the channel of the storage medium and equalizes the data to a target equation to generate equalized data, wherein the target equation is defined as $Read(D)=(1-D^2)^2 Written(D)$, where D is the delay of a data of the channel;
   a switching means that separates the equalized data generated by the equalizer into odd data samples and even data samples;
   a first detector that receives the even data samples of the channel of the storage medium from the switching means; and
   a second detector coupled in parallel to the first detector that receives odd data samples of the channel of the storage medium from the switching means, wherein the first detector and the second detector simultaneously process the even data samples and the odd data samples of the channel in parallel to generate an even processed data and an odd processed data, respectively; and
   a serializer that receives the even processed data and the odd processed data generated by the first detector and the second detector, respectively, and combines the even processed data and the odd processed data to generate a serial processed data.

5. The system of claim 4, wherein the storage medium is a disc drive.

6. The detector system of claim 4, wherein the first detector and the second detector are Viterbi Detectors.

7. A method for simultaneously processing even and odd samples of data according to a target equation, comprising:
   receiving even data samples of a data channel;
   receiving odd data samples of the data channel; and
   simultaneously processing the even data samples and the odd data samples of the data channel according to the target equation, wherein the target equation is defined as $Read(D)=(1-D^2)^2 Written(D)$, where D is the delay of a data of the channel.

8. The method of claim 7, wherein a first detector receives the even data samples and a second detector connected in parallel with the first detector receives the odd data samples.

9. The method of claim 7, wherein simultaneously processing the even data samples and the odd data samples is performed by a first detector that processes the even data samples and a second detector that processes the odd data samples simultaneously.

10. The method of claim 9, wherein the first detector and the second detector are Viterbi Detectors.

11. A method for simultaneously processing even and odd samples of data according to a target equation, comprising:
    equalizing data received from a channel of a storage medium in accordance with a target equation to generate equalized data, wherein the target equation is defined as $Read(D)=(1-D^2)^2 Written(D)$, where D is the delay of a data of the channel;
    separating the equalized data into odd data samples and even data samples;
    simultaneously processing the even data samples and the odd data samples of the channel in parallel to generate an even processed data and an odd processed data; and
    interleaving the even processed data and the odd processed data to generate a serial processed data.

12. The method of claim 11, wherein equalizing data is performed by an equalizer that receives data from the channel of the storage medium.

13. The method of claim 11, wherein separating the equalized data is performed by a switching means that separates the equalized data generated by an equalizer into odd data samples and even data samples.

14. The method of claim 11, wherein simultaneously processing the even data samples and the odd data samples in parallel is performed by a first detector that receives the even data samples and a second detector coupled in parallel to the first detector that receives odd data samples.

15. The method of claim 14, wherein the first detector and the second detector are Viterbi Detectors.

16. The method of claim 11, wherein interleaving the even processed data and the odd processed data is performed by a serializer.

* * * * *